(12) United States Patent
Choi

(10) Patent No.: US 11,036,396 B2
(45) Date of Patent: Jun. 15, 2021

(54) MEDIA CONTROLLER AND DATA STORAGE APPARATUS INCLUDING THE SAME

(71) Applicant: SK hynix Inc., Icheon-si (KR)

(72) Inventor: Won Ha Choi, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 188 days.

(21) Appl. No.: 15/248,240

(22) Filed: Aug. 26, 2016

(65) Prior Publication Data

US 2017/0300239 A1     Oct. 19, 2017

(30) Foreign Application Priority Data

Apr. 19, 2016   (KR) .................. 10-2016-0047345

(51) Int. Cl.
     *G06F 3/06*     (2006.01)
(52) U.S. Cl.
     CPC .......... *G06F 3/0611* (2013.01); *G06F 3/0604* (2013.01); *G06F 3/0607* (2013.01); *G06F 3/068* (2013.01); *G06F 3/0658* (2013.01); *G06F 3/0661* (2013.01); *G06F 3/0685* (2013.01)
(58) Field of Classification Search
     None
     See application file for complete search history.

(56) References Cited

U.S. PATENT DOCUMENTS

| 7,606,987 | B2 * | 10/2009 | Sawa .................... G06F 3/0616 |
| | | | 711/154 |
| 7,696,778 | B1 | 4/2010 | Sreeramaneni et al. |
| 8,225,006 | B1 | 7/2012 | Karamcheti |
| 8,417,873 | B1 | 4/2013 | Karamcheti et al. |
| 8,904,082 | B1 | 12/2014 | Brahmadathan et al. |
| 9,727,258 | B1 | 8/2017 | Nazarian et al. |
| 9,760,494 | B2 * | 9/2017 | Gschwind ........... G06F 12/0891 |
| 10,303,378 | B2 * | 5/2019 | Kim ...................... G06F 3/0655 |
| 10,491,215 | B2 | 11/2019 | Cho et al. |
| 2003/0079115 | A1 * | 4/2003 | Henry ................. G06F 9/30043 |
| | | | 712/217 |

(Continued)

FOREIGN PATENT DOCUMENTS

KR   1020050100290 A   10/2005
KR   1020110013704 A   2/2011

(Continued)

*Primary Examiner* — Charles Rones
*Assistant Examiner* — Ryan Dare
(74) *Attorney, Agent, or Firm* — William Park & Associates Ltd.

(57) ABSTRACT

A data storage apparatus in accordance with an embodiment may include a memory device, a memory controller, and a media controller. The memory device may store data. The memory controller may output a packetized request signal for the memory device and receive a response signal to the packetized request signal according to a predetermined protocol. In response to a request packet provided from the memory controller, the media controller may generate a media command corresponding to the memory device, perform a read or write operation on the memory device, generate a response packet upon completion of the read or write operation, and transmit the generated response packet to the memory controller.

20 Claims, 6 Drawing Sheets

(56) References Cited

U.S. PATENT DOCUMENTS

| | | | |
|---|---|---|---|
| 2005/0044128 A1* | 2/2005 | Scott | G06F 13/1621 709/200 |
| 2005/0226080 A1 | 10/2005 | Lee | |
| 2006/0064546 A1* | 3/2006 | Arita | G06F 9/3824 711/130 |
| 2006/0151614 A1 | 7/2006 | Nishizawa et al. | |
| 2006/0179185 A1* | 8/2006 | Daly, Jr. | G06F 12/0897 710/39 |
| 2008/0074138 A1 | 3/2008 | Lee | |
| 2008/0082746 A1* | 4/2008 | Nakamura | G06F 11/0727 711/113 |
| 2008/0082766 A1 | 4/2008 | Okin et al. | |
| 2008/0109595 A1 | 5/2008 | Rajan et al. | |
| 2008/0162980 A1 | 7/2008 | Dahan et al. | |
| 2011/0029696 A1* | 2/2011 | Uehara | G06F 13/387 710/9 |
| 2011/0066798 A1 | 3/2011 | Kaiwa et al. | |
| 2011/0102073 A1 | 5/2011 | Riho | |
| 2011/0193590 A1 | 8/2011 | Nakagawa et al. | |
| 2011/0227234 A1 | 9/2011 | Nishizawa et al. | |
| 2011/0242916 A1 | 10/2011 | Seol et al. | |
| 2012/0185633 A1* | 7/2012 | Sano | G06F 15/17381 710/316 |
| 2013/0013970 A1* | 1/2013 | Tao | H04L 1/1835 714/748 |
| 2013/0015880 A1 | 1/2013 | Haraguchi | |
| 2013/0111299 A1 | 5/2013 | Hashimoto et al. | |
| 2014/0268973 A1 | 9/2014 | Connolly | |
| 2014/0344488 A1 | 11/2014 | Flynn et al. | |
| 2014/0372696 A1* | 12/2014 | Tune | G06F 12/0846 711/114 |
| 2015/0032965 A1* | 1/2015 | Sugimoto | G06F 12/0868 711/129 |
| 2015/0117122 A1 | 4/2015 | Lee et al. | |
| 2015/0186200 A1 | 7/2015 | Chen | |
| 2015/0186275 A1 | 7/2015 | Moga et al. | |
| 2015/0212879 A1 | 7/2015 | Choi et al. | |
| 2016/0204782 A1 | 7/2016 | Lee et al. | |
| 2016/0224247 A1* | 8/2016 | Woo | G06F 3/061 |
| 2017/0004040 A1 | 1/2017 | Vidyapoornachary et al. | |
| 2017/0040049 A1 | 2/2017 | Arai et al. | |
| 2017/0109091 A1 | 4/2017 | Gans | |
| 2017/0185480 A1 | 6/2017 | Choi | |
| 2017/0249223 A1* | 8/2017 | Sherlock | G06F 11/2092 |
| 2017/0300239 A1 | 10/2017 | Choi | |
| 2017/0300411 A1 | 10/2017 | Choi et al. | |
| 2017/0351451 A1 | 12/2017 | Gans | |
| 2020/0293197 A1* | 9/2020 | Choi | G06F 3/068 |

FOREIGN PATENT DOCUMENTS

| | | |
|---|---|---|
| KR | 1020130126321 A | 11/2013 |
| KR | 1020140078261 A | 6/2014 |
| WO | 2005004047 A1 | 1/2005 |

* cited by examiner

| OP | ADDRESS | TAG | DIRTY | GUARD |
|---|---|---|---|---|
| DATA |||||

FIG. 2

MEDIA CONTROLLER AND DATA STORAGE APPARATUS INCLUDING THE SAME

CROSS-REFERENCE TO RELATED APPLICATION

This application claims priority under 35 U.S.C. 119(a) to Korean patent application No. 10-2016-0047345 filed on Apr. 19, 2016, the disclosure of which is incorporated herein by reference in its entirety.

BACKGROUND

Embodiments of the present disclosure generally relate to an integrated circuit, and more particularly to a data storage apparatus performing read and write operations on different kinds of memory components having different latency variations.

A semiconductor memory device is implemented using a semiconductor material such as silicon (Si), germanium (Ge), germanium (Ge), gallium arsenide (GaAs), indium phosphide (InP), etc. Semiconductor memory devices are generally classified into a volatile memory device and a non-volatile memory device.

The volatile memory is a memory device that only retains its data while it is powered. Volatile memory devices may be classified into a static RAM (SRAM), a dynamic RAM (DRAM), a synchronous DRAM (SDRAM), etc. On the other hand, the nonvolatile memory may retain its data even in the absence of a power source. There are a variety of non-volatile memory devices such as a read only memory (ROM), a programmable read-only memory (PROM) device, an erasable programmable read-only memory (EPROM) device, an electrically erasable programmable read-only memory (EEPROM) device, a flash memory device, a phase change RAM (PRAM), a magnetic RAM (MRAM), a resistive RAM (RRAM), a ferroelectric RAM (FRAM), etc.

In recent times, a memory device including different kinds of memory components therein is being introduced. In order to control read and write operations being performed on different kinds of memory components, its control method must support the different kinds of memory components.

Therefore, it is necessary for its controller to provide sufficient flexibility to fit any kind of memory component the memory device includes.

SUMMARY

In accordance with an aspect of the present disclosure, a media controller may include a packet transceiver, a tag comparator, and a data processor. The packet transceiver may transmit and receive a request signal and a response signal, each of which is formed in a packet format, to and from a memory controller. The tag comparator may compare a tag of a current write request packet received through the packet transceiver with a tag of a queued write request packet having been received and scheduled to be processed, and determine if there is any queued write request packet having the same tag as that of the current write request packet. The data processor may put a hold on processing the current write request packet or change an address contained in the current write request packet and store data in the changed address if any queued write request packet has the same tag as the current write request packet according to a comparison result received from the tag comparator.

In accordance with an aspect of the present disclosure, a data storage apparatus may include a memory device, a memory controller, and a media controller. The memory device may store data. The memory controller may output a packetized request signal for the memory device and receive a response signal to the packetized request signal according to a predetermined protocol. The media controller may generate, in response to a request packet provided from the memory controller, a media command corresponding to the memory device, perform a read or write operation on the memory device, generate a response packet upon completion of the read or write operation, and transmit the generated response packet to the memory controller.

BRIEF DESCRIPTION OF THE DRAWINGS

FIG. 2 is a diagram illustrating an example of a packet structure transmitted/received between a memory controller and a media controller illustrated in FIG. 1.

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts.

In association with the embodiments of the present disclosure, specific structural and functional descriptions are disclosed only for illustrative purposes, the embodiments of the present disclosure can be implemented in various ways without departing from the scope or spirit of the present disclosure.

In description of the present disclosure, the terms "first" and "second" may be used to describe various components, but the components are not limited by the terms. The terms may be used to distinguish one component from another component. For example, a first component may be called a second component and a second component may be called a first component without departing from the scope of the present disclosure.

The terms used in the present application are merely used to describe specific embodiments and are not intended to limit the present disclosure. A singular expression may include a plural expression unless otherwise stated in the context.

Unless otherwise defined, all terms used herein, including technical or scientific terms, have the same meanings as understood by those skilled in the art. Terms defined in a generally used dictionary may be analyzed to have the same meaning as the context of the relevant art and may not be analyzed to have ideal meaning or excessively formal meaning unless clearly defined in the present application. The terminology used in the present disclosure is for the purpose of describing particular embodiments only and is not intended to limit the disclosure.

Figure 1:
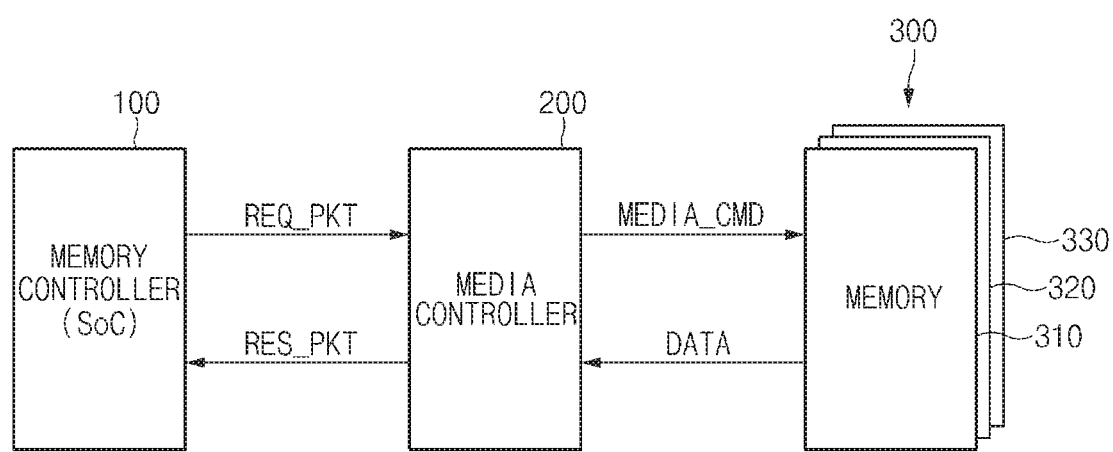
FIG. 1 is a diagram illustrating an example of a data storage apparatus according to an embodiment of the present disclosure.

FIG. 1 is a diagram illustrating an example of a data storage apparatus according to an embodiment of the present disclosure.

Referring to FIG. 1, the data storage apparatus may include a memory controller 100, a media controller 200, and a memory device 300.

The memory controller 100 may communicate with the media controller 200 according to a predetermined protocol so as to control data read and write operations for a memory device 300. For this purpose, the memory controller 100 may transmit a request packet (e.g., packetized request signal) REQ_PKT to the media controller 200 using an abstracted protocol provided between the media controller 200 and the memory controller 100, and may then receive a response packet (e.g., packetized response signal) RES_PKT from the media controller 200. For example, the memory controller 100 may transmit and receive a packetized signal having the same structure as FIG. 2 to and from the media controller 200 according to non-deterministic timing points. As described above, the memory controller 100 may communicate with only the media controller 200. Even if the memory device 300 includes different types of memories 310, 320, and 330 having different latency variations, the memory controller 100 may control data read/write operations being performed on the memories 310, 320, 330 using only one protocol provided between the memory controller 100 and the media controller 200. In addition, even if the memory controller 100 and the memory device 300 have different data processing speeds, the memory controller 100 may communicate with the media controller 200, not according to the processing capability of the memory device 300, but according to the processing capability of the memory controller 100. The memory controller 100 may be a part of a host device. The memory controller 100 may be a part of a System on Chip (SoC).

The media controller 200 is coupled between the memory controller 100 and the memory device 300, and may communicate with each of the memory controller 100 and the memory device 300 according to a predetermined protocol. The media controller 200 may generate a media command MEDIA_CMD in response to the request packet REQ_PKT from the memory controller 100, and may read or write data by accessing the corresponding address of the memory device 300 using the media command MEDIA_CMD. That is, the media controller 200 may transmit and receive packetized signals to and from the memory controller 100 using the abstracted protocol, and may generate the media command MEDIA_CMD appropriate for physical layers (PHY) and protocols of the respective memories 310, 320, 330. The media controller 200 may access the memory device 300 using the generated media command MEDIA_CMD. For example, In response to the request packet REQ_PKT provided from the memory controller 100, the media controller 200 may determine, using information contained in the request packet REQ_PKT, which request (e.g., write request or read request) is associated with the corresponding packet, and may also determine which one of the memories 310, 320, and 330 contained in the memory device 300 needs to be accessed so as to perform the request. The media controller 200 may generate a media command for the memory to be accessed (e.g., a command appropriate for a PHY and a protocol of the memory to be accessed), and may perform the data read or write operation on the memory device 300. In an embodiment, the memories 310, 320, and 330 of the memory device 300 may be different kinds of memory components having different latency variations. If a long latency occurs in a target memory (e.g., 310), the media controller 200 may store all or some parts of the write data in at least one of the other memories (e.g., 320 and 330), and may inform the memory controller 100 of information regarding the stored parts of the write data. For example, if a tag of a new write request packet (i.e., a current write request packet) received during a data write mode by the media controller 200 is identical to at least one of the tags of the write request packets (i.e., standby or queued write request packets) that have already been received by the media controller 200 and scheduled to be processed, the media controller 200 may hold the current write request packet without processing it, and then the media controller 200 may change an address of the current write request packet to another address, may store data in a changed position corresponding to the changed address, and may inform the memory controller 100 of information regarding the changed position. In addition, when the media controller 200 transmits the response packet RES_PKT to the memory controller 100 in response to the request packet REQ_PKT, the media controller 200 may first determine whether target data the media controller 200 is sending is the data that has been stored in the changed position because the tags of the newly received write request packet and a previously received write request packet were identical to each other. If the target data is identical to the storage-position-changed data (i.e., address-changed data), the media controller 200 may insert information indicating the change in address and data storage position into the response packet RES_PKT, and may transmit the resultant response packet RES_PKT to the memory controller 100.

The memory controller 300 may read or write data DATA in response to the media command MEDIA_CMD provided from the media controller 200. The memory device 300 may include different kinds of memories 310, 320, and 330 having different latency variations. In this case, each of the memories 310, 320, and 330 may be a volatile memory or a non-volatile memory.

Figure 2:
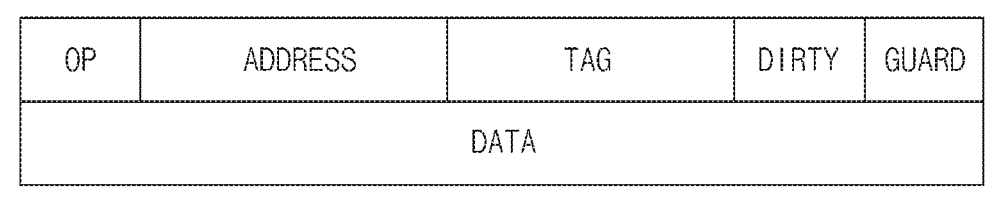

FIG. 2 is a diagram illustrating an example of a packet structure transmitted/received between the memory controller 100 and the media controller 200 illustrated in FIG. 1.

Referring to FIG. 2, the packet may include an OP field OP, an address field ADDRESS, a tag field TAG, a dirty field DIRTY, a guard field GUARD, and a data field DATA.

The OP field OP may include information (e.g., OP code) indicating a packet type. In other words, the OP field may include information for identifying whether the corresponding packet is a packet for the read operation or a packet for the write operation.

The address field ADDRESS may include information regarding the position of the memory device 300 from which data is scheduled to be read or the position of the memory device 300 to which data of the memory device 300 is scheduled to be written.

The tag field TAG may include identification information (e.g., tag) for distinguishing between packets. In order to create such a tag, a value independent of the address may be used. Alternatively, some parts of the address may be used as the tag or some parts of the tag. The number of bits contained in the tag field TAG may be equal to or less than the number of bits contained in the address field ADDRESS.

The data field DATA may include write data, read data, and information regarding changes (e.g., changed address information), etc. That is, if the packet is a write request packet, the data field DATA may include data to be written. If the packet is a read response packet, the data field DATA may include read data. If the packet is a write response packet, the data field DATA may include an acknowledgement signal ("ACK signal") or information regarding the ACK signal and an address changes according to whether or not the position of written data is changed.

The guard field GUARD may indicate a certain value indicating whether or not position change (i.e., address change) of written data is allowed. If the guard field GUARD is set to "1," this means that position change is disallowed. If the guard field GUARD is set to zero "0," this means that position change is allowed. The guard field GUARD value may be determined only by the memory controller 100. The media controller 200 and the memory device 300 may be read-only devices.

The dirty field DIRTY may include a certain value indicating whether or not the address has been changed. For example, assuming that the tag of a newly received packet is identical to the tag of a queued packet, and thus data of the newly received packet is stored in a modified address instead of an original address, the media controller 200 may allocate the value of "1" to the dirty field DIRTY such that the dirty field DIRTY is set to "1."

Figure 3:
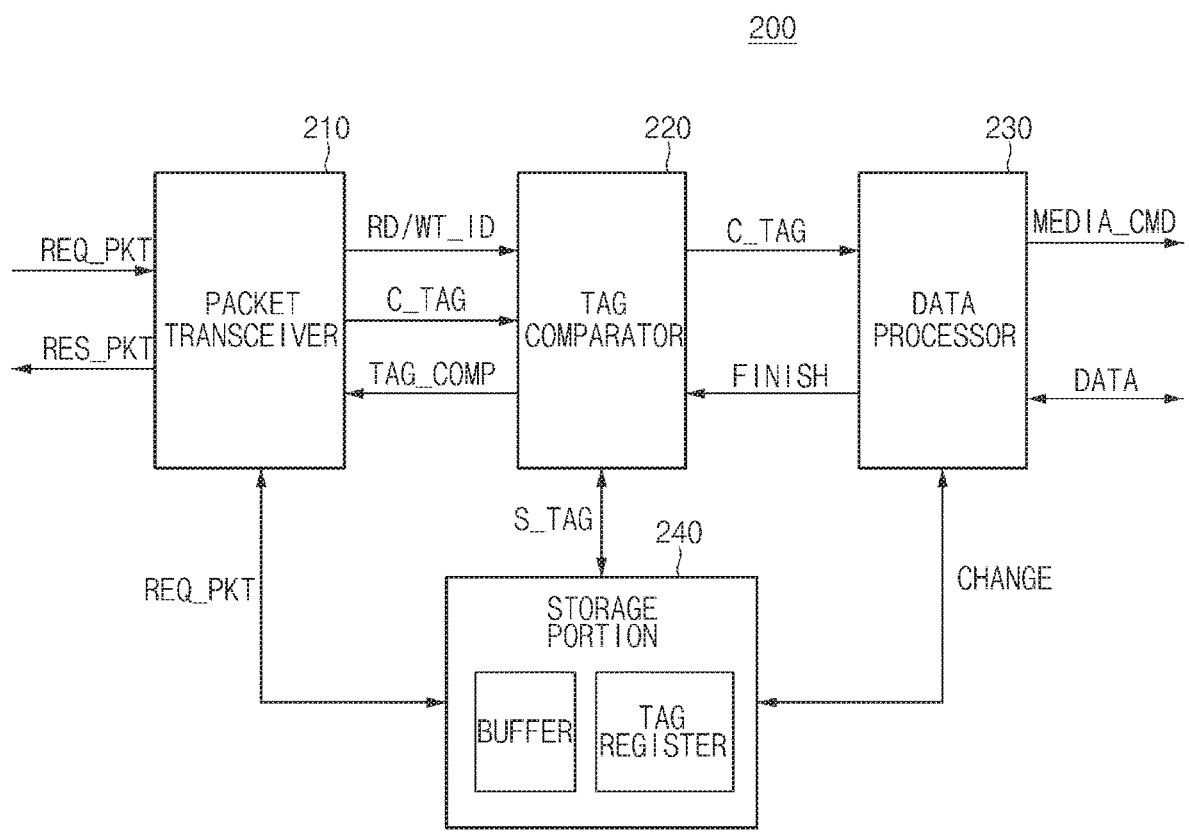
FIG. 3 is a diagram illustrating an example of the media controller illustrated in FIG. 1.

FIG. 3 is a diagram illustrating an example of the media controller 200 illustrated in FIG. 1.

Referring to FIG. 3, the media controller 200 may include a packet transceiver 210, a tag comparator 220, a data processor 230, and a storage portion 240. The packet transceiver 210 may communicate with the memory controller 100, such that a request packet REQ_PKT for reading or writing data and a response packet RES_PKT for responding to the request packet REQ_PKT are communicated between the packet transceiver 210 and the memory controller 100. That is, the packet transceiver 210 may receive the request packet REQ_PKT for the data read or write operation from the memory controller 100 according to a predetermined protocol, and may transmit the response packet RES_PKT responding to the request packet REQ_PKT to the memory controller 100

In response to the request packet REQ_PKT provided from the memory controller 100, the packet transceiver 210 may determine, based on the OP code contained in the packet, whether the received request packet REQ_PKT is a request packet for the data read operation or a request packet for the data write operation, and may transmit read/write identification information RD/WT_ID indicating a determined result and tag information C_TAG to the tag comparator 220. Upon completion of the data write operation, the packet transceiver 210 may transmit, to the memory controller 100, the response packet RES_PKT containing an acknowledgment ACK message as a response to the write request. If the data storage position is changed because of a long latency of the accessed memory or because the previously received tag and a newly received tag are the same as each other, the packet transceiver 210 may insert associated information (e.g., information regarding the changed position, etc.) into the response packet RES_PKT, and may transmit the resultant response packet RES_PKT to the memory controller 100. In addition, upon completion of the data read operation, the packet transceiver 210 may insert read data in the response packet RES_PKT as a response to the read request, and may transmit the resultant response packet RES_PKT to the memory controller 100.

Specifically, assuming that data to be contained in the response packet RES_PKT has a changed storage position by address change because the previously received tag and a newly received tag are the same as each other, the packet transceiver 210 may change a dirty bit of the corresponding response packet RES_PKT to the value of "1" and may thus transmit the resultant response packet RES_PKT having the dirty bit of "1." In this case, the packet transceiver 210 may selectively change the dirty bit according to a tag comparison signal TAG_COMP received from the tag comparator 220.

The tag comparator 220 may compare the tag C_TAG of a current packet with tags S_TAG of the queued packets. In this case, the current packet may include the write request packet received from the current memory controller 100 and the response packet (e.g., read response packet or write response packet) to be transmitted to the memory controller 100. The queued packets may include packets that have changed their storage positions to other storage positions because they had the same tag as the tag in the write request packets queued in a buffer of the storage portion 240. Here, the queued write request packets are write request packets that have been received from the memory controller 100 and then scheduled to be processed.

The tag comparator 220 may compare tag information C_TAG contained in the write request packet currently received from the memory controller 100 with tag information S_TAG of the other write request packets queued in a buffer to wait their turns. If the tag information C_TAG of the currently received write request packet has the same tag as the tag information S_TAG of any of the queued write request packet, the tag comparator 220 may transmit the corresponding tag information C_TAG to the data processor 230. In addition, in response to a signal FINISH, which is provided from the data processor 230, indicating that the previous read operation has completed (or read data) or indicating that the previous write operation has completed, the tag comparator 220 may compare a tag of the corresponding response packet (current read response packet or current write response packet) with tag information stored in a tag register of the storage portion 240, and may transmit a signal TAG_COMP indicating the comparison result to the packet transceiver 210.

In response to the request packets REQ_PKT received from the memory controller 100, the data processor 230 may access the memory device 300 according to the order of execution of program/read operations to perform the data read/write operations corresponding to the packets. In this case, when the data processor 230 accesses the memory device 300, the data processor 230 may generate a media command MEDIA_CMD appropriate for a physical layer (PHY) and a protocol of each accessed memory 310, 320, and 330, and may read or write data DATA according to the media command MEDIA_CMD.

During the data write mode, if a long latency occurs in the memory 310 accessed by the data processor 230, for example, if the data write time exceeds a predetermined threshold time, the data processor 230 may store all or some parts of the write data in at least one of the other memories (e.g., 320 and 330), and may store information (tag, original position, changed position, etc.) regarding the result stored in the storage portion 240.

Specifically, according to a first case, if the tag information C_TAG is received from the tag comparator 220 (if the packet has a tag whose information is the same as tag information C_TAG stored in the buffer), the data processor 230 may treat the packet as a faulty (or erroneous) packet, and the data processor 230 may put a hold on processing the faulty packet. Alternatively, according to a second case, after changing the address contained in the corresponding packet to either an address of a memory different from a target memory to be accessed or an address of the same memory as the target memory, the data processor 230 may access the changed address, store data therein, transmit information CHANGE associated with the stored data to the storage portion 240, and store the information CHANGE in the storage portion 240. In this case, information as to whether the packet having the same tag will be processed according to the first case or the second case may vary depending on how the tag is created.

If the read or write operation requested by each request packet REQ_PKT is completed, the data processor 230 may transmit, to the tag comparator 220, the signal indicating operation completion with respect to the corresponding packet.

The storage portion 240 may include a buffer and a tag register. In the buffer, a plurality of packets having been received from the memory controller 100 may be queued to be processed. The tag register may store tag information regarding packets that have changed their data storage positions because of the long latency or the tag conflict (e.g., a situation where the tag of the current request packet has the same tag as the tag of any of the queued request packet). In addition, the storage portion 240 may temporarily store data read by the data processor 230.

Figure 4:
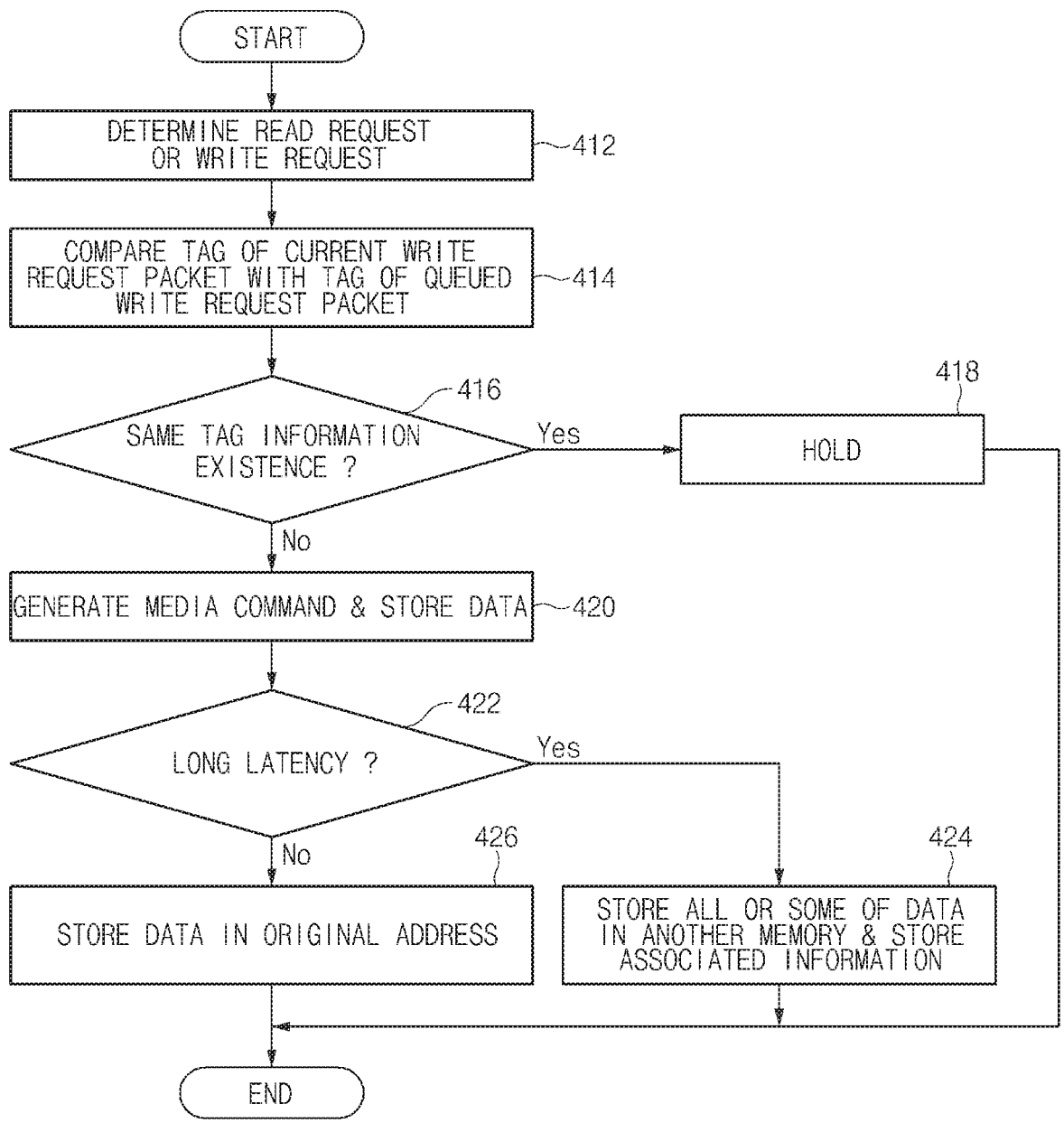
FIG. 4 is a flowchart illustrating an example of a data write process that may be used when a tag is completely separated from an address or when some parts of the address are used as the tag.
Figure 5:
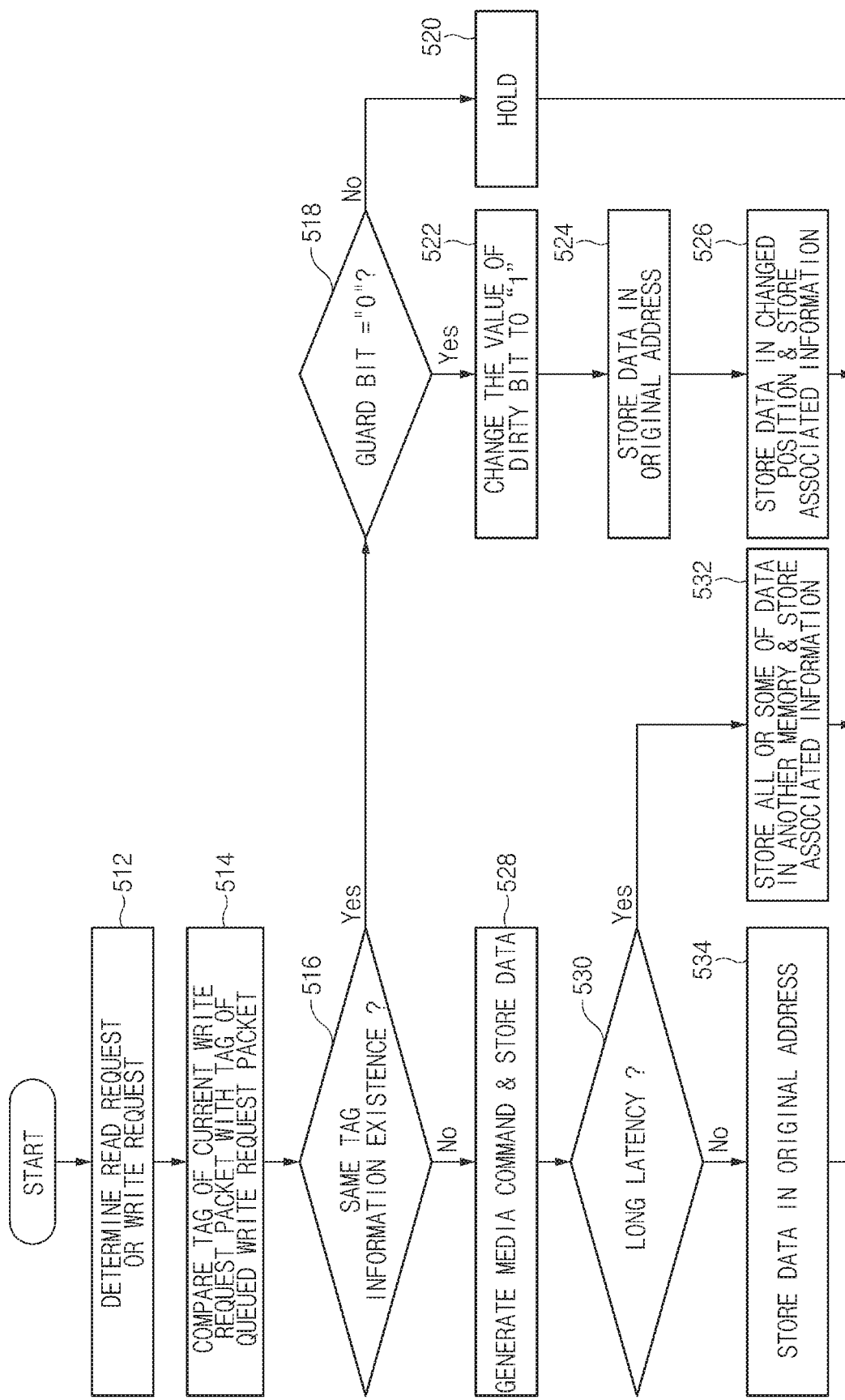
FIG. 5 is a flowchart illustrating an example of a data write process that may be used when some parts of an address are used as the entire tag.

FIGS. 4 and 5 are flowcharts illustrating the operations requested by the write request.

In an embodiment, packets having the same tag may be processed in different ways according to how to determine each tag of the packets. As can be seen from FIG. 2, the tag according to an embodiment may have a value independent of the address. Alternatively, some parts of the address may be used as some parts of the tag or the entire tag.

If a tag is used as an index for each packet, how to process packets having the same tag may vary according to how to create the tag.

First, in an example embodiment, the tag may have a value independent of the address, or some parts of the address may be used as some parts of the tag, as discussed below.

FIG. 4 is a flowchart illustrating an example of a data write process. In this example, the tag may have a value independent of the address, or some parts of the address may be used as some parts of the tag.

Referring to FIG. 4, in response to the request packet REQ_PKT provided from the memory controller 100, the packet transceiver 210 of the media controller 200 may confirm the OP code of the received packet, may determine whether the currently received packet is the write request packet or the read request packet, and may transmit a signal RD/WT_ID indicating the determined result to the tag comparator 220 (Step 412).

If the currently received packet is the write request packet, the tag comparator 220 may compare a tag C_TAG of the currently received write request packet with each tag S_TAG of the queued write request packets previously received and queued in a buffer of the storage portion 240 (Step 414), and may determine if there is any queued write request packet having the same tag as that of the currently received write request packet (Step 416).

If there is any queued write request packet having the same tag as that of the current write request packet, the tag comparator 220 may transmit tag information C_TAG of the currently received write request packet to the data processor 230. In this case, the data processor 230 may determine the currently received write request packet to be a faulty packet, and may put a hold on processing the faulty packet (Step 418).

The tag may be used as an identifier for identifying each packet. Thus, if there is any queued write request packet having the same tag as that of the currently received write request packet, it is impossible to distinguish between the packets, and thus data cannot be normally processed. Accordingly, in principle, in a situation where a previously received write request packet has not yet been processed, i.e., where the ACK signal to the corresponding packet has not yet been transmitted to the memory controller, it is not desirable to receive another packet (e.g., currently received write request packet) having the same tag as that of the corresponding packet (e.g., queued write request packet).

However, in an embodiment, if the tag of the current write request packet is identical to the tag of the queued write request packet, the data processor 230 may put a hold on processing the current write request packet. The held write request packet may be dropped after the corresponding queued write request packet is completely processed.

If there is no queued write request packet having the same tag as that of the current write request packet (Step 416), the data processor 230 may process the write request packet according to the order of execution of programming. In other words, the data processor 230 may generate the media command MEDIA_CMD appropriate for the physical layer (PHY) and a protocol of a target memory to be accessed according to the order of execution of programming, and may perform the write operation by accessing the memory 310 according to the media command MEDIA_CMD (Step 420).

In this case, if a latency of the accessed memory 310 increases (Step 422), the data processor 420 may store all or some parts of data to be written in other memories (320 and 330), and may store associated information in the storage portion 240 (Step 424).

For example, the data processor 420 may store, in the storage portion 240, specific information CHANGE, which includes tag information regarding the corresponding packet, an original storage position, and a changed storage position. When a write completion message is transferred to the memory controller 100 upon completion of the write operation requested by the corresponding packet, the stored information may also be transmitted to the memory controller 100.

If the latency of the accessed memory 310 is normal in step 422, the data processor 420 may access an original address according to the media command MEDIA_CMD and store data in the accessed original address (Step 426).

FIG. 5 is a flowchart illustrating an example of a data write process that may be used when some parts of the tag are used as the entire tag.

Referring to FIG. 5, in response to the request packet REQ_PKT provided from the memory controller 100, the packet transceiver 210 of the media controller 200 may confirm the OP code of the received packet. The packet transceiver 210 of the media controller 200 may also determine whether the currently received packet is the write request packet or the read request packet, and may transmit the confirmed result to the tag comparator 220 (Step 512).

If the current packet is the write request packet, the tag comparator 220 may compare a tag C_TAG of the current write request packet with each tag S_TAG of the queued write request packets previously received and queued in a buffer of the storage portion 240 (Step 514), and may determine if there is any queued write request packet having the same tag as that of the current write request packet (Step 516).

If there is any queued write request packet having the same tag as that of the current write request packet, the tag comparator 220 may transmit tag information C_TAG of the current write request packet to the data processor 230.

In this case, the data processor 230 may check a guard bit GUARD of the current write request packet (Step 518).

If the guard bit GUARD is set to "1," the data processor 230 may put a hold on processing the current write request packet (Step 520).

In contrast, if the guard bit GUARD is set to "0 (zero)," the data processor 230 may change the dirty bit DIRTY of the current write request packet to the value of "1" (Step 522), and may change the original address stored in the corresponding packet either to an address of a different memory or to another address of the same memory (Step 524).

In principle, as can be seen from FIG. 4, in a situation where the received write request packet has not yet been processed, it is not desirable to receive the current write request packet having the same tag as that of the queued write request packet.

However, in an embodiment, if the entire tag is created by using only some parts of the address as described above, some values of the address to be used for data storage may be identical even if all values of the address to be used for data storage are different. It is desirable for different packets to have different tags. In reality, however, some packets may unavoidably have the same tag because of a policy for creating such tags (e.g., policy for using some parts of the address as the entire tag). In this case, when the memory controller 100 generates a tag for the corresponding packet to transmit the request packet to the media controller 200, the memory controller 100 may determine whether or not the same tag as a previous one has been generated.

Where the policy for processing data of the corresponding packet is predefined, the memory controller 100 may allocate the value of "1" or "0" to the guard bit GUARD if the same tag is generated as described above. For example, the memory controller 100 may allocate the value of "1" to the guard bit GUARD as a default value. However, if the corresponding data is scheduled to be processed according to a separate policy, the guard bit GUARD may be set to zero "0".

The data processor 230 may change the address to another address, access the changed address, store data in the position corresponding to the changed address, and store associated information CHANGE including, for example, tag, original position, changed position, etc. in the storage portion 240 (Step 526).

In this case, the data processor 230 may change a storage address to store data in another memory different from an originally desired target memory or at another position in the same memory as the originally desired target memory. For example, the data processor 230 may use at least one of various methods discussed below. First, a Least Significant Bit (LSB) of a rank address may be changed such that data is stored in another rank. Secondly, an address of a channel may be changed such that data is stored either in the same type of memory of another channel or in a different type of memory of another channel. Thirdly, a row address may be changed such that data is stored in another row contained in the same memory. Fourthly, a bank address may be changed such that data is stored in another bank contained in the same memory.

In accordance with an embodiment, if the current write request packet having the same tag as that of the queued write request packet is received, data of the current write request packet may be stored at another position (changed address). The stored data may be processed according to a separate policy.

If there is no queued write request packet having the same tag as the tag of the current write request packet (Step 516), the data processor 230 may generate the media command MEDIA_CMD appropriate for the physical layer (PHY) and the protocol of a target memory to be accessed according to the order of execution of programming, and may perform the write operation by accessing the memory 310 according to the media command MEDIA_CMD (Step 528).

In this case, if a latency time of the accessed memory 310 becomes longer (Step 530), the data processor 420 may store all or some of data to be written in other memories 320 and 330, and may store associated information CHANGE in the storage portion 240 (Step 532).

For example, the data processor 420 may store not only tag information regarding the corresponding packet, but also information regarding an original storage position and a changed storage position of the corresponding packet in the storage portion 240. When a message indicating that the write completion has been transmitted to the memory controller 100 after completion of the write operation for the corresponding packet, the above-mentioned information stored in the storage portion 240 may also be transmitted to the memory controller 100 as necessary.

If a latency time of the accessed memory 310 is normal (Step 530), the data processor 230 may access an original address of the memory 310 in response to the media command MEDIA_CMD, and may store data in the original address (Step 534).

Although FIGS. 4 and 5 have disclosed only the write request packet as an example, if the memory controller 200 receives the read request packet for a memory, the memory controller 200 may access the address contained in the read request packet according to the order of execution, and may read data stored at the position indicating the accessed address. That is, the above-mentioned address change may not be applied to the read request, and as such a detailed description thereof will herein be omitted.

Figure 6:
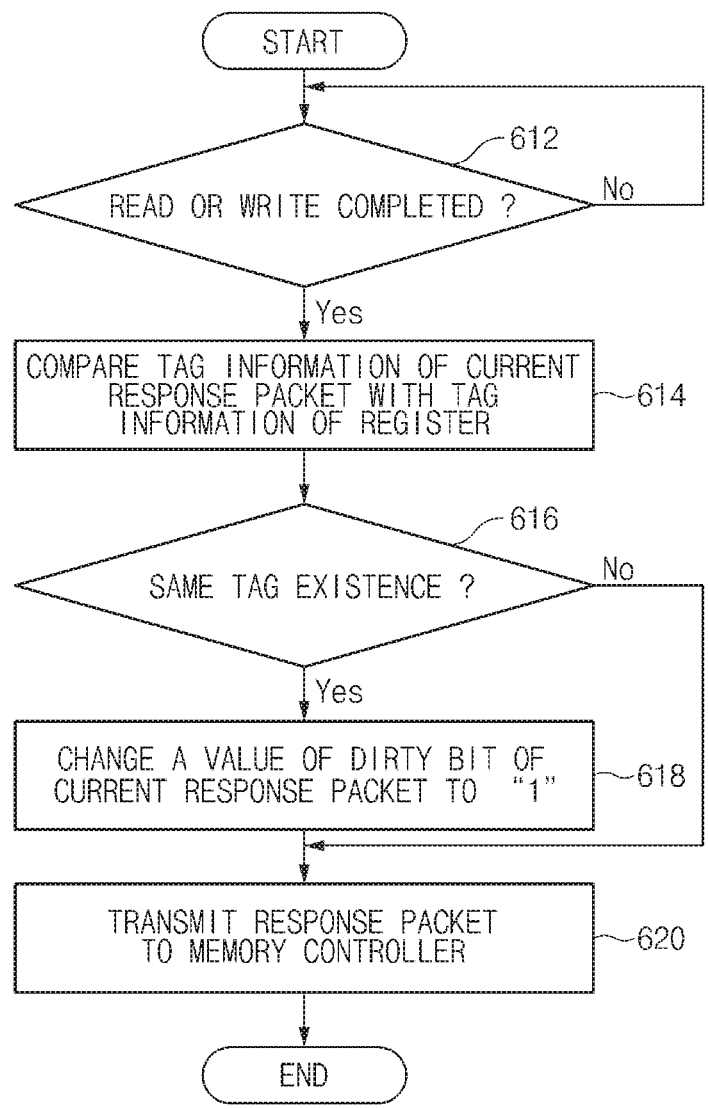
FIG. 6 is a flowchart illustrating example operations that may be carried out when a response to a requested packet is executed.

FIG. 6 is a flowchart illustrating example operations that may be carried out when a response to a requested packet is executed.

Referring to FIG. 6, if the data processor 230 completes the data read operation or the data write operation in response to the read request or the write request provided from the memory controller 100 (Step 612), the tag comparator 220 may compare a tag of the current response packet with tag information stored in the tag register of the storage portion 240 (Step 614).

For example, during the read response mode, if the tag comparator 220 receives a message indicating that a read operation has been completed or read data has been received from the data processor 230, the tag comparator 220 may compare a tag of the current read response packet with tag information stored in the tag register of the storage portion 240. In the write response mode, if the tag comparator 220 receives a message indicating that a write operation has been completed from the data processor 230, the tag comparator 220 may compare a tag of the current write response packet with tag information stored in the tag register of the storage portion 240.

Upon completion of such comparisons, the tag comparator 220 may transmit a signal TAT_COMP indicating the result of comparison to the packet transceiver 210 (Step 616).

If there is the same tag as a tag of the current response packet in the tag register (Step 616), the packet transceiver 210 may change a dirty bit DIRTY of the corresponding current response packet (current read response packet or current write response packet) to the value of "1" (Step 616). The packet transceiver 210 may change the dirty bit DIRTY of the corresponding current response packet (current read response packet or current write response packet) to the value of "1" (Step 618).

Upon completion of such changes, the packet transceiver 210 may insert read data (in the case of the read response) or an ACK signal (in the case of the write response) in a data field of the response packet RES_PKT, and may transmit the resultant data field to the memory controller 100 (Step 620).

If there is no tag that is the same as a tag of the current response packet in the tag register (Step 616), the packet transceiver 210 may insert either read data (in the case of the read response) or an ACK signal (in the case of the write response) in a data field of the response packet, without changing the value of the dirty bit DIRTY to another value, and may transmit the resultant data field to the memory controller 100 (Step 620).

In other words, prior to transmitting the response packet to the memory controller 100, the media controller 200 may first determine whether read or write data corresponding to the corresponding response is address-changed data shown in FIG. 5. If the read or write data is determined to be the address-changed data, the media controller 200 may change a dirty bit of the corresponding response packet to the value of "1," and may transmit the resultant response packet having the dirty bit of "1" to the memory controller 100, and then may notify, to the memory controller 100, the occurrence of address change on the basis of the received response packet.

As discussed above, various embodiments of the present disclosure can allow a single memory controller to control read and write (R/W) operations with respect to different kinds of memories by applying only one protocol to the different kinds of memories, and the number of iterations of creation and transmission/reception (Tx/Rx) of control signals may decrease, and thus system load may decrease.

In addition, various embodiments of the present disclosure can minimize a latency variation otherwise encountered in processing data stored in different types of memories having different latency variations.

Those skilled in the art will appreciate that embodiments of the present disclosure may be carried out in other ways than those set forth herein without departing from the spirit and essential characteristics of these embodiments. The above embodiments are therefore to be construed in all aspects as illustrative and not restrictive.

The above embodiments of the present disclosure are illustrative and not limitative. Various alternatives and equivalents are possible. The above embodiments are not limited by the type of deposition, etching polishing, and patterning steps described herein. Nor is the embodiment limited to any specific type of semiconductor device. For example, the present disclosure may be implemented in a dynamic random access memory (DRAM) device or non volatile memory device. Other additions, subtractions, or modifications are intended to fall within the scope of the appended claims.

What is claimed is:

1. A media controller comprising:
   a packet transceiver configured to transmit a response signal and receive a request signal, each of which is formed in a packet format, to and/or from a memory controller;
   a tag comparator configured to compare a tag of a write request packet received through the packet transceiver with a tag of a queued write request packet scheduled to be processed, and check whether there is any queued write request packet having the same tag as that of the write request packet; and
   a data processor configured to change an address contained in the write request packet and store data of the write request packet in the changed address of a memory device or drop the write request packet based on a comparison result received from the tag comparator and a value contained in the write request packet.

2. The media controller according to claim 1, wherein:
   in response to a request packet, the packet transceiver checks whether the received packet is a read request packet or a write request packet.

3. The media controller according to claim 1, wherein:
   when a response packet to address changed data is transmitted to the memory controller, the packet transceiver insert information indicating address change in the response packet.

4. The media controller according to claim 3, wherein the tag comparator compares a tag of each response packet with tags of packets each having changed address, checks whether the response packet is an address-changed packet, and informs the packet transceiver of the checked result.

5. The media controller according to claim 3, wherein the packet transceiver changes a value of a dirty bit of the write response packet to another value so as to indicate address change.

6. The media controller according to claim 1, wherein:
   the data processor changes the address contained in the write request packet when any queued write request packet has the same tag as the write request packet and a guard bit of the write request packet has a first value, and
   the data processor drops the write request packet when any queued write request packet has the same tag as the write request packet and a guard bit of the write request packet has a second value.

7. The media controller according to claim 6, wherein the data processor changes the address contained in the write request packet to an address of a memory different from an original target memory or to another address in the same memory as the original target memory.

8. The media controller according to claim 7, wherein the data processor changes the address by changing at least one of a least significant bit (LSB) contained in a rank address, a channel address, a row address, and a bank address.

9. The media controller according to claim 1, wherein the data processor generates a media command appropriate for a physical layer and a protocol of a memory to be used for data storage, and accesses the corresponding memory according to the media command.

10. The media controller according to claim 9, wherein:
    the data processor stores all or some of write data in at least one of other memories when a latency time of a memory to be accessed is longer than a predetermined threshold time.

11. A data storage apparatus comprising:
a memory device configured to store data;
a memory controller configured to output a packetized request signal for the memory device and receive a response signal to the packetized request signal according to a predetermined protocol; and
a media controller configured to generate, in response to a request packet provided from the memory controller, a media command corresponding to the memory device, perform a memory operation on the memory device, generate a response packet upon completion of the memory operation, and transmit the response packet to the memory controller,
wherein the media controller compares a write request packet with a queued write request packet, and changes an address contained in the write request packet and store data of the write request packet in the changed address of the memory device or drops the write request packet based on a comparison result and a value contained in the write request packet.

12. The data storage apparatus according to claim 11, wherein the memory device includes different kinds of memories having different latency variations.

13. The data storage apparatus according to claim 12, wherein the media controller generates a media command appropriate for a physical layer and a protocol of a memory to be used for data storage, and accesses the corresponding memory according to the media command.

14. The data storage apparatus according to claim 13, wherein:
when a latency time of a memory to be accessed is longer than a predetermined threshold time, the media controller stores all or some of write data in at least one of other memories.

15. The data storage apparatus according to claim 11, wherein:
the media controller changes the address contained in the write request packet when any queued write request packet has the same tag as the write request packet and a guard bit of the write request packet has a first value, and
the media controller drops the write request packet when any queued write request packet has the same tag as the write request packet and a guard bit of the write request packet has a second value.

16. The data storage apparatus according to claim 11, wherein:
in response to the write request packet provided from the memory controller, the media controller compares a tag of the write request packet with a tag of a queued write request packet scheduled to be processed so as to check whether any queued write request packet has the same tag as the write request packet, puts a hold on processing the write request packet or changes an address contained in the write request packet when there is a queued write request packet having the same tag as the write request packet, and stores data in the address.

17. The data storage circuit apparatus according to claim 15, wherein the media controller changes the address contained in the write request packet to an address of a memory different from an original target memory or to another address in the same memory as the original target memory.

18. The data storage apparatus according to claim 17, wherein the media controller changes the address by changing at least one of a least significant bit (LSB) contained in a rank address, a channel address, a row address, and a bank address.

19. The data storage apparatus according to claim 15, wherein, prior to transmitting a response packet to the memory controller, the media controller compares a tag of the response packet with tags of packets each having changed address, and check whether the response packet is an address-changed packet.

20. The data storage apparatus according to claim 19, wherein:
when a response packet to address changed data is transmitted to the memory controller, the media controller inserts information indicating address change in the response packet.

* * * * *